United States Patent [19]

Zinck et al.

[11] 4,365,705

[45] Dec. 28, 1982

[54] PROCESS AND APPARATUS FOR CONTINUOUSLY LOADING PALLETS WITH CERAMIC ARTICLES

[75] Inventors: Joseph W. Zinck, Bryant; Steven L. Affolder, Berne, both of Ind.

[73] Assignee: CTS Corporation, Elkhart, Ind.

[21] Appl. No.: 183,244

[22] Filed: Sep. 2, 1980

[51] Int. Cl.$^3$ .................. B65G 47/53; B65G 47/78
[52] U.S. Cl. ...................... 198/424; 53/251; 53/496; 53/534; 198/466; 414/68; 414/110
[58] Field of Search ............ 198/424, 466, 469; 414/68, 110; 53/247, 251, 496, 505, 534, 537; 425/422

[56] References Cited

U.S. PATENT DOCUMENTS

| | | | |
|---|---|---|---|
| 2,247,175 | 6/1941 | Orstrom | 198/424 X |
| 3,026,990 | 3/1962 | Rayburn et al. | 198/424 |
| 3,210,450 | 10/1965 | Bratton | 425/422 X |
| 3,297,129 | 1/1967 | Lesch | 198/424 |
| 3,673,756 | 7/1972 | Prete et al. | 53/496 |
| 3,972,409 | 8/1976 | Hayashi | 198/424 |

*Primary Examiner*—Jeffrey V. Nase
*Attorney, Agent, or Firm*—Larry J. Palguta; John A. Young

[57] ABSTRACT

An apparatus (10) is mounted on a briquetting press (12) and receives briquettes (14) in a magazine (18) which consists of two side rails (22, 24) and a smoothly polished base (28). A sensor (30) determines when the magazine (18) is full and operatively effects, through a programmable controller or microprocessor (not shown), the actuation of a motor (40) to withdraw the base (28) and discharge vertically the row of briquettes (29) from the magazine (18) onto one of a series of pallets (82, 84, 86, 88) transported transversely at a location below the surface of the magazine (18). Pallet position is sensed automatically so that briquettes (29) discharged from the magazine (18) are disposed at a preferred location on the pallet (82, 84, 86, 88). The operations of loading the magazine (18), detecting the magazine (18) as being fully loaded, and discharging the briquettes (29) from the magazine (18) onto a pallet, are coordinated with the movement with the pallets so that loading occurs automatically. All the operator need do is load the apparatus (10) with empty pallets and withdraw fully loaded pallets. Should the operator fail to withdraw loaded pallets, a microswitch (110) will cause automatic shut down of pallet movement. The apparatus (10) is hinge (162) mounted onto the briquetting press (12) for convenient retrofit thereon.

17 Claims, 8 Drawing Figures

PROCESS AND APPARATUS FOR CONTINUOUSLY LOADING PALLETS WITH CERAMIC ARTICLES

DESCRIPTION

1. Technical Field

The invention relates to presses for forming briquettes from loose powders and more particularly to means for handling the briquettes. The purpose of the present invention is to route the briquettes from the compacting press first into a magazine and then onto pallets or "saggers" for ready transfer. The briquettes are then fired into self-supporting, rigid, sintered bodies which become substrates for use in making resistors and the like.

2. Background Art

The method and process for forming briquettes is disclosed in Stephen Burry's copending Application Ser. No. 156,387 filed June 4, 1980 and assigned to the same assignee as the present application, Application Ser. No. 156,387 being incorporated by reference herein. The subsequent handling of the briquettes is addressed in the present application.

Green briquettes, which are compacted from loose powders, are handled before firing. Handling these briquettes in such a way that they will not become damaged or injured in transit between the point of discharge from the compacting press and the firing furnace has long been a serious problem. While the briquettes are not extremely fragile, they do tend to chip and lose some of the standoffs which form essential and necessary portions of the briquette.

The briquettes are particularly susceptible to damage when they are caused to impinge or slide over rough surfaces; consequently, handling the briquette between the press and kiln before firing, is an important and necessary feature to material handling.

Many expedients have been proposed for handling the briquettes, and such handling techniques can be readily developed, but few lend themselves to a combination of automatic disposal in which the steps are adequately designed to preclude damage to the compacted briquette prior to sintering the briquette into a cohesive hard state.

In a prior approach to this general problem, the firable briquettes are fed through a hopper into a receiving bin and then transported en masse to a furnace or kiln. Because the briquettes tend to spill over each other as they come into contact with each other, they tend to become jostled in a manner which knocks off corners, standoffs, and fill the openings in which the conductors are intended to be disposed.

In previous methods for handling briquetted components, besides the severe and sometimes unpredictable damage suffered by the components, the components had to be sorted after being passed through the kiln.

Background patents showing the handling of somewhat similar products in related manners are taught in:

| U.S. Pat. No. | Inventor | Title |
| --- | --- | --- |
| 2,734,249 | M. C. Willis | Roofing Tile Making Machines |
| 3,070,838 | W. Hostettler | Moulding Line for Moulding Loose Particle Material Into Preliminary Blanks Destined to be Pressed in a Multiple Tier Press |
| 3,412,874 | S. O. Shiffer | Automated Tile Handling System |
| 3,666,076 | R. C. Miller, et al. | Transporting System |
| 3,934,701 | J. R. Mooney, et al. | Linear Indexng Machine |
| 4,164,391 | W. D. Howard, et al. | Conveyor for Processing |

DISCLOSURE OF THE INVENTION

The present invention provides a process and apparatus for automatically and individually handling compacted briquettes, by first stacking the briquettes by sliding them into a cartridge or magazine. Then an unloading mechanism for the magazine, wherein a polished surface or base of the magazine is withdrawn, gently transfers the in-row briquettes onto a preselected location of a pallet which is located vertically below the magazine. It is an important feature of the present invention that the described process occurs automatically, so that the magazine periodically discharges a "row" of such briquettes onto selected locations of pallets passing continuously through the machine. The loaded pallets are then withdrawn for movement through a kiln where the briquettes are fired.

It is a further important feature of the present invention that empty pallets can be continuously charged into the machine and fully loaded pallets withdrawn, all of the pallet filling operation occurring automatically by sensors which determine the proper or appropriate pallet position at which the group of "in-row" briquettes are jointly discharged onto the underlying pallet. The principal advantage of the present invention is that the briquettes can be manufactured in quantity, stacked in the compacted form in which they are produced, and then the stacks discharged at preferred positions on a pallet, the pallet thereafter being handled together with the supported briquettes as a whole, and passed through a kiln. All that the operator needs to do is to supply replacement pallets from time to time to the machine and to remove the fully briquette-loaded pallets from the machine for subsequent kiln firing.

BEST MODE FOR CARRYING OUT THE INVENTION

Figure 1:
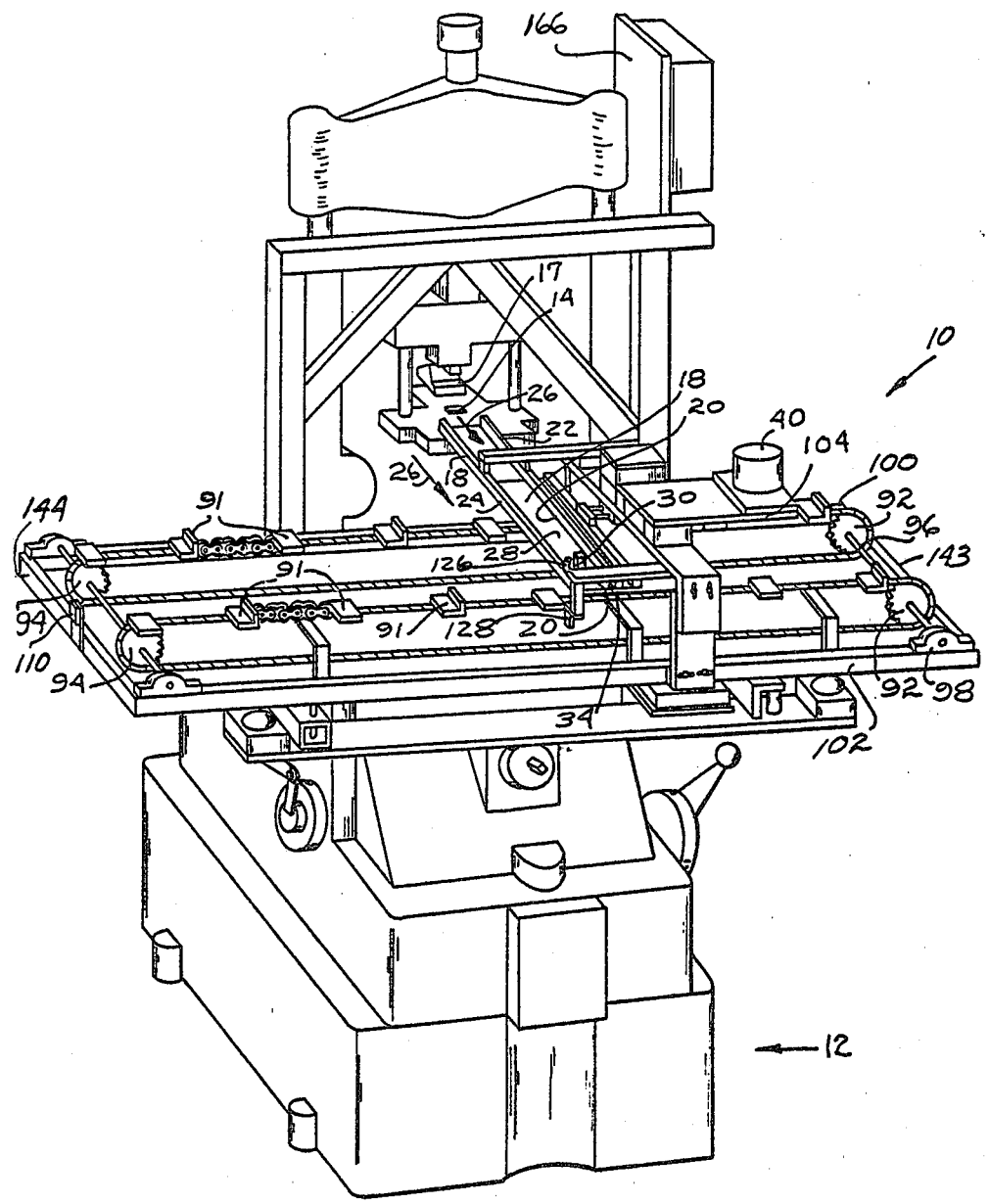
FIGS. 1 and 2 are isometric views of the apparatus showing the press and loading apparatus.

Referring now to the drawings, and particularly to FIGS. 1–3, 5 and 8, there is disclosed an automatic pallet loader, designated generally by reference numeral 10.

The apparatus includes a press 12 which continuously produces briquettes 14 from loose powder material (not shown) in the manner fully disclosed and claimed in copending application Ser. No. 156,387 assigned to the same assignee as the present application, and filed June 4, 1980. This referenced and incorporated application discloses details of the briquetting operation.

As the briquettes 14 are formed, they are transferred by shoe 17 into a magazine 18 which includes a slot 20 and guide rails 22, 24 which guide the incoming briquettes advancing in the direction of the arrow 26, and stacked on the polished base 28. Once the magazine is completely filled with side-by-side briquettes 29, a fiber optic scanner 30 is actuated. The fiber optic scanner is located at the end 34 of the magazine. The scanner is a typical fiber optic scanner, the details of which are not part of the present invention. One suitable scanner is manufactured by "SCAN-A-MATIC FIBER OPTIC COMPANY", their catalog number S322-3.

Once the fiber optic sensor 30 is energized, it sensitizes operation of a door motor 40. The motor 40 operates a bell crank 42 and crank arm 43 having connection with rod 44, through a spherical connection 46 and rotary bearing 48 with a slide 50 formed in a magazine 52. Lost motion clearance connections 54 guide the slide 50 in its reciprocable movement in ways 56 which are formed in magazine 52. Slide 50 is attached to rods 60, and rod pins 64 are connected to the polished base 28 as noted in FIG. 3. The base 28 is guided on rails 70, 72 which are bolted to one another. Slide 50 is caused to reciprocate responsively to turning of the crank 42 which is rotated about pin 76.

Figure 3:
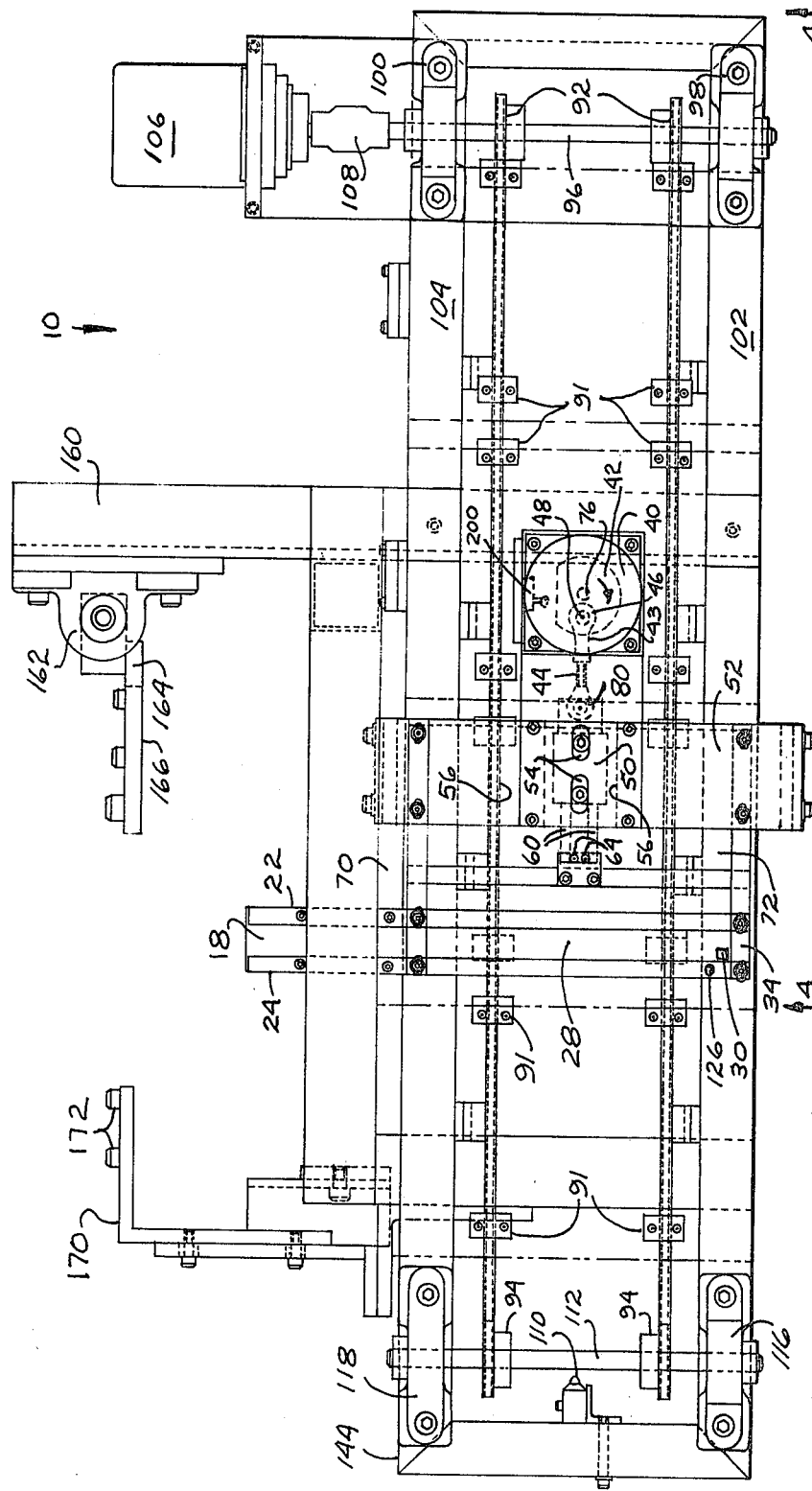
FIG. 3 is a top view of the apparatus shown detached from the press and illustrating the mounting structure by which the ceramic pallet loader is mounted onto a briquetting press.
Figure 4:
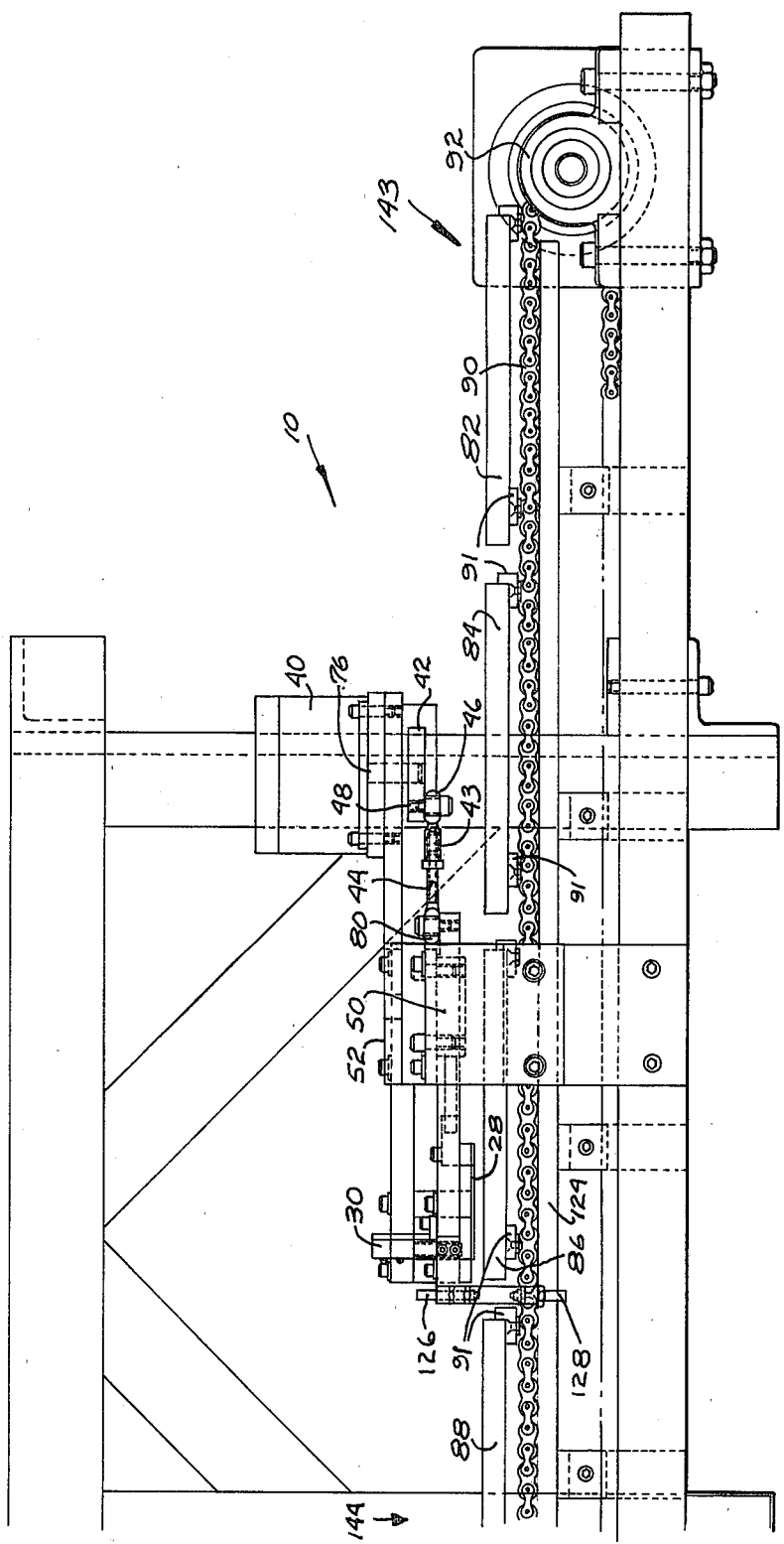
FIG. 4 is a front view looking in the directions of arrows 4—4 in FIG. 3.
Figure 5:
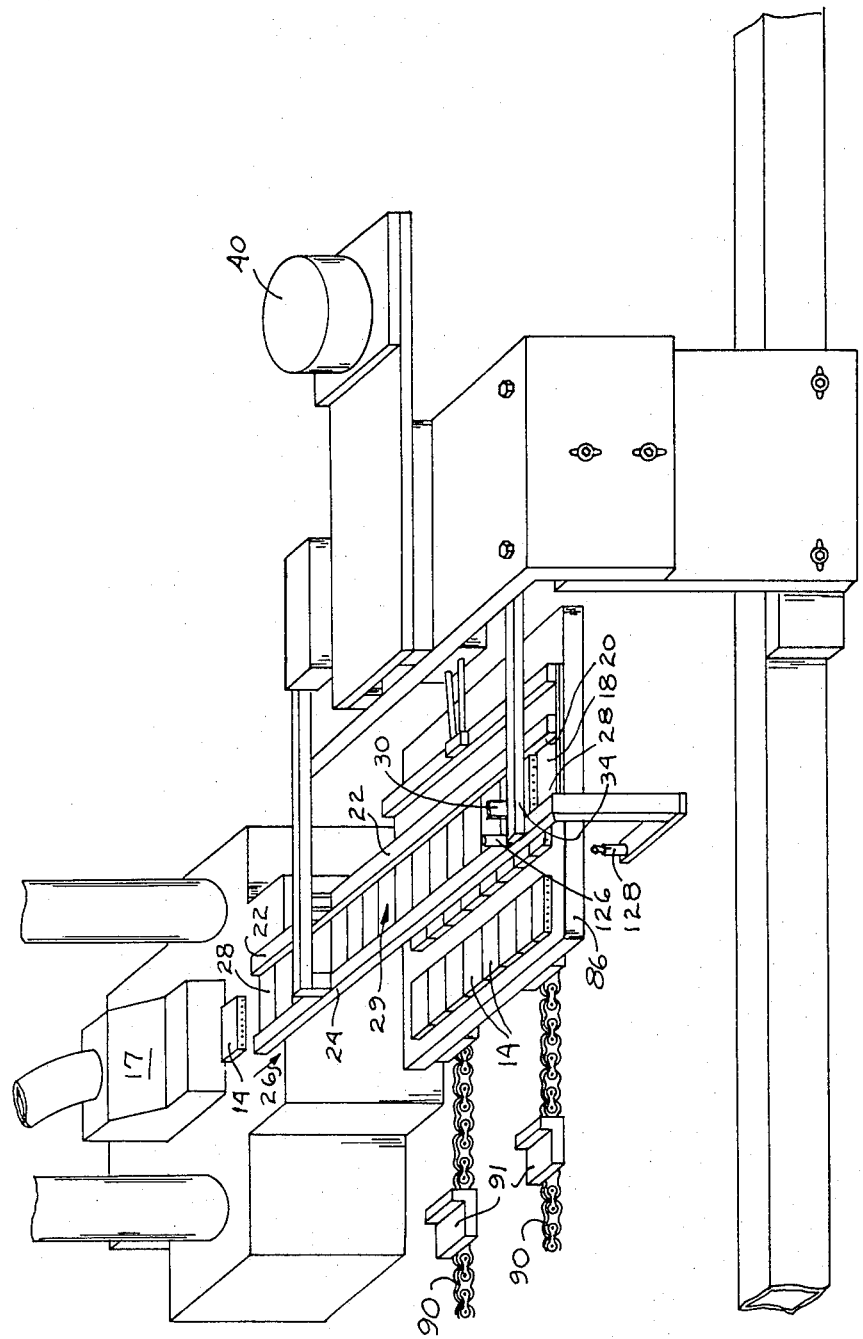
FIG. 5 is a schematic view of the sagger and magazine.

As will be seen, from FIGS. 3 and 4, the connecting rod 44 has a spherical sector surface 80 which additionally permits universal type movement between the connecting rod 44 and crank arm 43.

Door motor 40 drives the connecting rod 44 to effect reciprocation of the slide 50 and back-and-forth movement of the polished base 28. As the polished false bottom or base 28 retracts, the briquettes bear against guide rail 22 and then gently drop onto an underlying pallet. The vertical distance between the polished base 28 and the receiving surface of the pallet is small so that there is no substantial vertical drop of the briquettes as they transfer from a higher level to a lower level.

Once the base 28 retracts, the briquettes 29 aligned thereon, are transferred onto one or another of pallets (saggers) 82, 84, 86, or 88 (FIG. 4). The exact number of pallets, and their configuration, is variable, and while four pallets are described in the present illustration, it should be understood that more or less number of pallets in a different configuration are a matter of machine design.

Each pallet is driven by means of two spaced endless chains 90 with spaced mounting pads 91. Each chain 90 travels endlessly between associated drive sprockets 92 and idler sprockets 94. Drive sprockets 92 are mounted on a shaft 96 supported by pillow block bearings 98, 100 which are carried by sides 102 and 104 of the machine.

A synchronized stepping motor 106 acting through a planetary gear assembly 108 drives the power shaft 96 and therefore the power sprockets. Should the pallets fail to be removed from the machine, for example, if fully-loaded pallet 88 fails to be removed, it will contact microswitch 110 (FIG. 3). Microswitch 110 will stop operation of motor 106 thereby discontinuing the operation.

Idler sprockets 94 are carried on an idler shaft 112 received in pillow block idler bearings 116, 118 carried by sides 102, 104.

To insure linear movement of the chain, a number of spaced guides 124 are arranged so that the chains will ride through them to impose rectilinear movement of the chain, and prevent sideways or "whipping" movement of the chains.

The time at which the retraction of the base 28 occurs, is determined by a not shown controller or microprocessor having an electronic memory (FIG. 7), responsively to a photo switch 126 which when interrupted from connection with light source 128 by an advancing pallet, after a predetermined time, the controller operating operate the door motor 40 so that the false bottom 28 will open, if the controller has been previously sensitized by the optic scanner 30 which indicates a magazine fully loaded with briquettes. At the time of discharge, the pallet is advanced sufficiently beyond the magazine 18 so that the pallet is positioned properly for receiving another row of briquettes.

Figure 7:
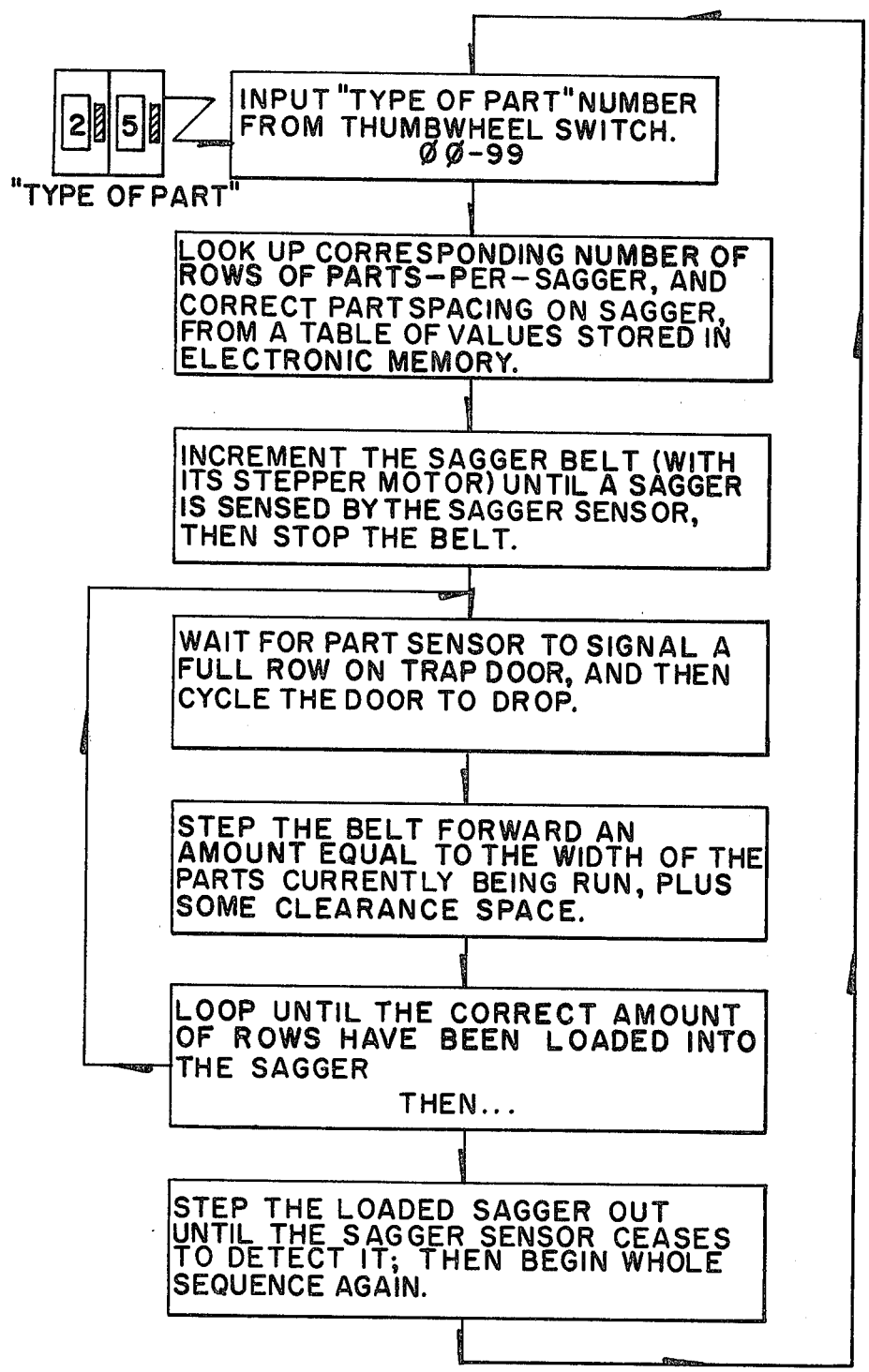
FIG. 7 is a block diagram of the preprogrammed sequence of operations.

Following initial operation of the base 28 by the door motor 40, the controller (not shown) effects subsequent base 28 actuations so long as the fiber optic scanner 30 has signalled a complete filling of the magazine 18. Thus, there are periodic transfers of briquettes at spaced locations on each pallet. When scanner 30 has signalled a full magazine and the motor 40 operates, a timer (not shown) insures that the motor 40 remains activated for a certain period of time so that the crank 42 rotates one full revolution. A microswitch 200 is contacted by the bell crank 42 during each revolution of the crank 42 and thereby communicates to the controller the "home" or inactive position of the crank 42. As illustrated in FIG. 7, the operator enters, through a thumbwheel switch, the "type of part" number which effects selection of the appropriate program. The controller then controls operation of the stepper motor 106, responsively to the various sensor inputs, to advance the operatively positioned pallet the appropriate distances for loading the selected "part" size and configuration. In this way, the briquettes are never discharged except in relation to a predetermined location on a subjacent pallet. Periodically, the operator puts new pallets at the one end 143 (FIG. 3) and removes loaded pallets at the other end 144.

To mount the loader, there is a hinge 160 having a hinge mounting 162 received through a bushing 164 of plate 166 which bolts to the press 12 through fasteners (not shown). A stabilizing bracket 170 having fasteners 172 is positioned for firmly securing the loader 10 to the press 12 when the loader is in position for operation.

Figures 2, 8:
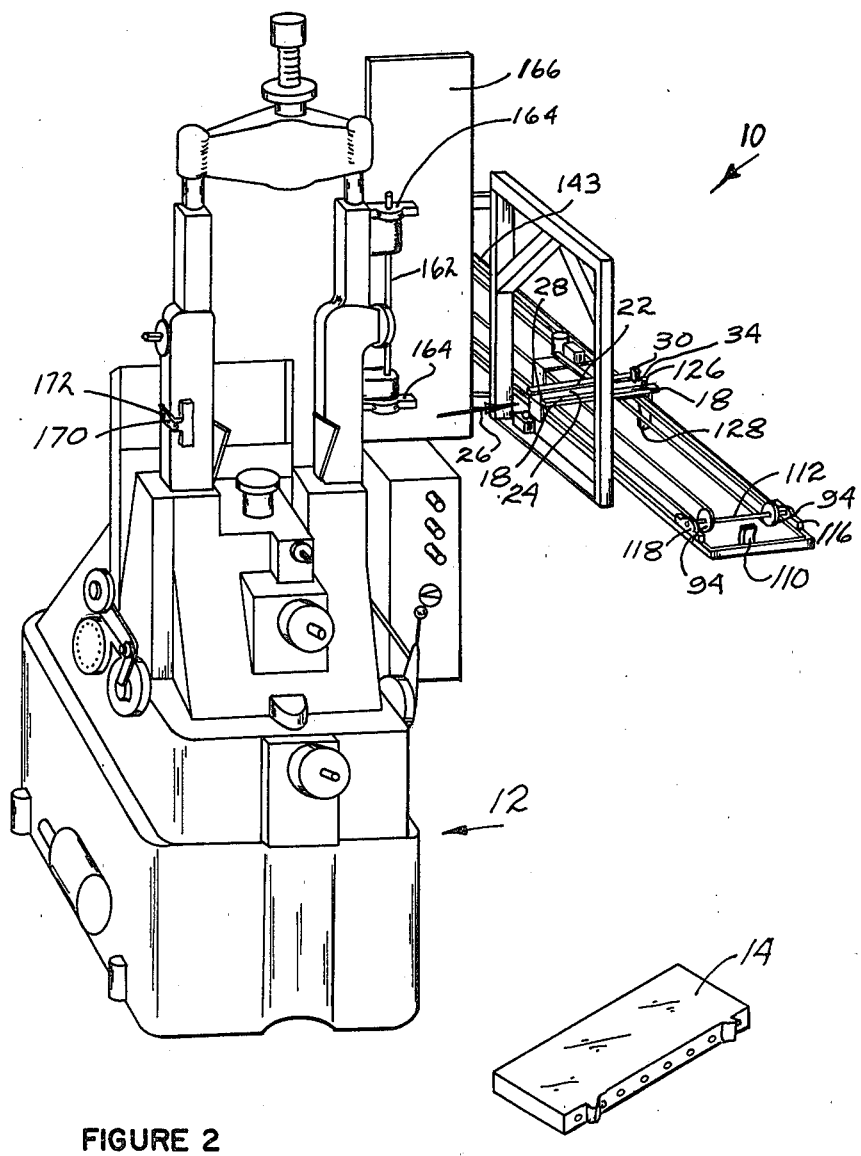
FIG. 8 is an isometric view of one of the briquettes.

The hinge mounting 162 permits the loader 10 to be swung back periodically to provide access to the press 12 either for servicing the press or for ready removal of the pallet loader 10 and equipping the press with a different loader as shown in FIG. 2. This ready access to the press 12 as well as the hinge mounting facilitates press maintenance, and readily permits retrofitting existing presses with the present invention by simply providing an adapter plate 166 and hinge mounting 162 for a preassembled pallet loader mechanism as described.

The press 12, once commencing operation and being adequately supplied with powder from which the briquettes are made, operates continuously to produce briquettes. The briquettes in turn are loaded, by means of the automatic pallet loader described, and the finished compacted briquettes after having been loaded onto a pallet, are transferred onto other conveyor means by automatic or manual means. The pallet loader can be adjusted to a given size briquette, and is exchangable from time to time as design requires in association with a particular press.

As shown in FIGS. 1-4, the loader 10 is a "box shape" design for maximum strength of the loader, and for prevention of bending or buckling once it is in an operative position.

Operation

In operation, the press 12 continuously produces briquettes 14, by compacting loose powders through compression, and subsequent discharge. Fully compacted briquettes 14 are then translated by a shoe 17 onto a magazine 18 with the briquettes 29 being in stacked or side-by-side relation, proportioned to fit through the slot 20 at the input end of the magazine. The briquettes 29 continue to fill the magazine until the magazine is substantially filled from one end to the other. At this point, the magazine is fully loaded, and the endmost briquette (at end 34 of the magazine) will energize a fiber optic scanner 30.

Figure 6:
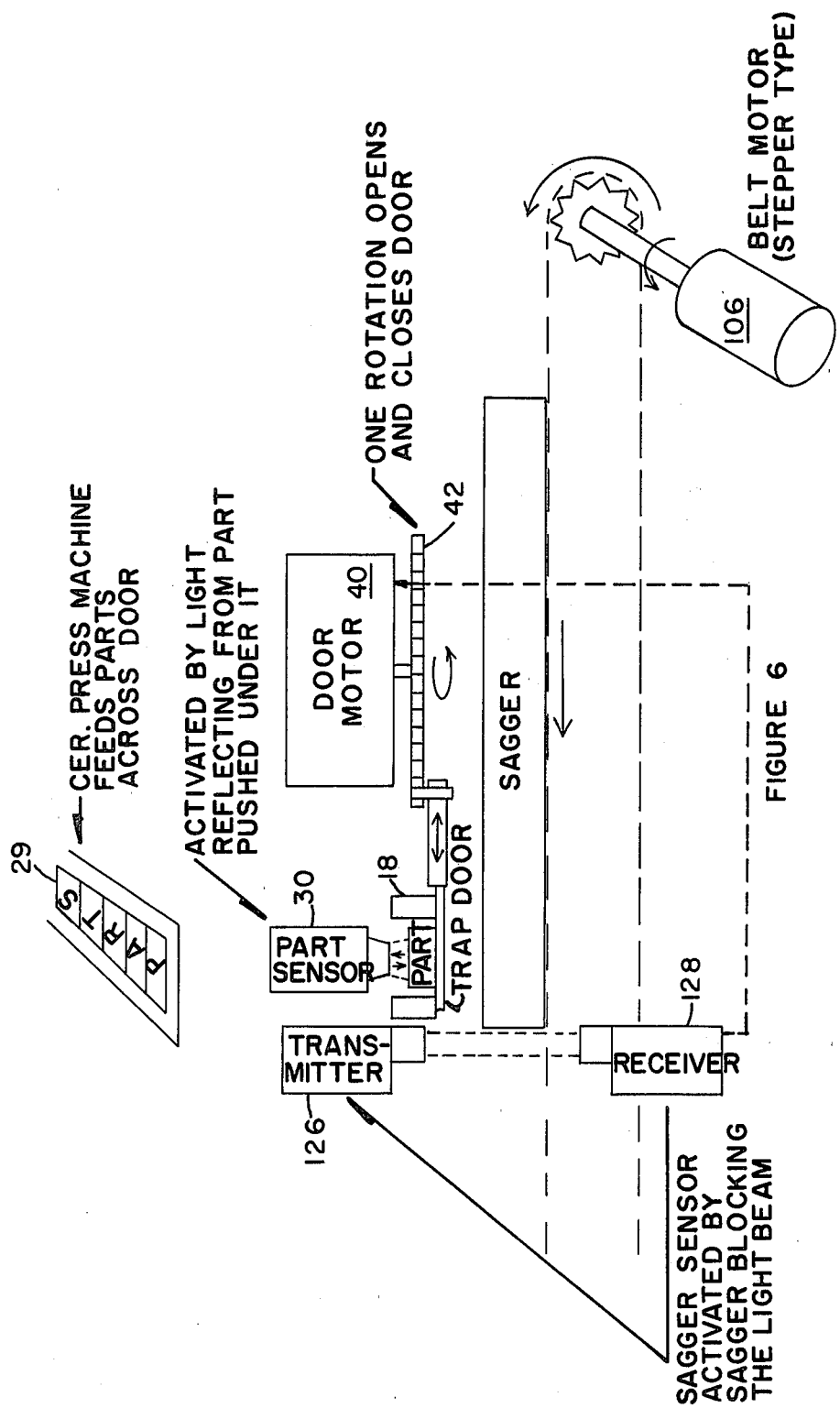
FIG. 6 is a schematic detail view illustrating the pallet loader and sensors for controlling the door motor.

The fiber optic scanner 30 operatively effects, through the controller (not shown) operation of the door motor 40, the controller having sensed an advancing pallet 82, 84, 86 or 88 (FIG. 4) interrupting light source 128 which has an optical coupling with the photo switch 126. That is, once the advancing pallet interrupts the optical coupling and the magazine 18 is full of briquettes the magazine is unloaded by operation of motor 40 which causes the bottom 28 to be drawn to the right (FIG. 3). Rotation of the bell crank 42 and rod 44, causes slide 50 to move toward the right in the ways 56 (FIG. 3) thereby drawing with it the retractable base 28 and gently dropping the row of briquettes 29 onto the surface of a subjacent pallet, i.e. one or the other of the advancing pallets 82, 84, 86 or 88. The operation of the loader 10 is illustrated schematically in FIG. 6.

A timer (previously described) insures that motor 40 remains activated long enough to rotate the crank 42 one full revolution, and then the briquettes 29 (FIG. 5) will be deposited at a preferred location on the pallet. After such discharge, the controller causes the stepper motor 106 to advance the pallet and when the fiber optic scanner 30 has been actuated to signal that the magazine is again full, the motor 40 will again be operated to deposit another row of briquettes onto the subjacent carrier or pallet at a preferred location on the pallet, which is advanced by the chain conveyor. The advancing rate of the pallet is coordinated with the rate of fill of the magazine, so that approximately three discharges following three fillings of the magazine occur for each pallet, i.e. in the time it takes a pallet to move beneath the door in a briquette-receiving mode.

It is possible, of course, to vary the filling rate of the magazine, the size of the pallet, and the rate of movement of the pallet, etc. All of these described movements are coordinated to match the production rate of the briquettes, which is the controlling factor determining the loading rate of the magazine, and the advancing rate of the pallets. As the pallets advance, and are subsequently loaded with briquettes, the pallets are removed from the machine by the operator. Should there be any failure to remove a fully loaded pallet, such failure will be sensed by contact of the foremost loaded pallet with a microswitch 110 which, when operated, will deenergize motor 106 driving the sprocket and advancing the pallets. In this case, any additional briquettes, instead of being loaded, are passed through the magazine, and are caught as overflow briquettes moving out of the open end of the magazine at end 34.

The operation as described, continues automatically and should the operator desire to revise the machine for a different size briquette, a new part type (FIG. 7) can be entered into the controller, the loader can be internally adjusted by changing the distance between the rails and adjusting the switches for a different size and design pallet, or a new and different loader can be provided by decoupling the existing unloader at hinge mounting 162, removing the hinge pin, and replacing the loader with one which accommodates the new size briquette. The replacement loader is again mounted through a hinge mounting which lends itself to either replacement, repair, or hinge movement away from the press so that the press can be readily serviced.

Industrial Applicability

The invention is used in manufacturing insulative substrates for use in producing resistors and resistor networks.

Conclusion

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention and it is intended that such revisions and adaptations will be included within the scope of the following claims as equivalents of the invention.

We claim:

1. An apparatus for automatic, damage free handling of impact sensitive, friable unfired briquetted substrates supplied to said apparatus by a briquetting press means, comprising means for receiving the briquetted substrates and including substantially linear guide means proportioned to receive the briquettes which are advanced under continuous compression derived by serial nonbending engagement of the substrates along the line of movement with said guide means maintaining the alignment of said substrates and a bottom support base having a low friction surface characterized by a smooth nonresistant path uniformly nonimpeding to a slideable nonbuckling advancement of the plurality of aligned substrates advanced on said low friction surface, means for retracting a portion of said bottom support base so that upon retraction said guide means maintains the alignment of said aligned substrates to effect damage free vertical discharge of said aligned substrates, receiving sensor means for determining when the guide means is filled with aligned substrates, conveyor means disposed below said guide means and moving transversely thereto, carrying means disposed on said conveyor means, and position sensor means for determining the position of the carrying means relative to said guide means whereby said carrying means is positioned for receiving said aligned substrates upon discharge from said guide means which is disposed over said carrying means.

2. The apparatus in accordance with claim 1, further comprising means for pivotally mounting said apparatus relative to the briquetting press means.

3. The apparatus in accordance with claim 1, including drive means for operating said conveyor means and for advancing successively said carrying means into operative position.

4. The apparatus in accordance with claim 1, wherein said means for retracting a portion of said support base includes an electric motor.

5. The apparatus in accordance with claim 4, wherein the means for retracting a portion of said support base includes a bell-crank connection and swivel bearing means connected to said motor.

6. The apparatus in accordance with claim 1, further comprising means for operatively terminating the movement of said conveyor means upon failure to timely remove a substrate-loaded carrying means from said conveyor means.

7. The apparatus in accordance with claim 1, further comprising timing means to maintain the operation of the means for retracting the portion of the support base for a full cycle of operation after the receiving sensor means no longer detects that said receiving means is filled.

8. The apparatus in accordance with claim 1, further comprising means for determining the position of said portion of said support base.

9. The apparatus in accordance with claim 1, wherein the aligned substrates are positioned to maximize the number of substrates loaded onto the carrying means.

10. The apparatus in accordance with claim 1, wherein said guide means comprises spaced apart adjustable guide rails that can be adjusted laterally to change the distance between said rails and enable the handling of different size substrates.

11. A process for the damage free loading of impact sensitive, friable ceramic briquettes onto successive carriers comprising the steps of: providing a plurality of briquettes from a press means and positively advancing said briquettes into a substantially linear magazine means, collecting and maintaining the alignment of the plurality of briquettes, positively advancing the collected briquettes under continuous compression derived by serial nonbending engagement of the briquettes along the line of movement within said magazine means having a false bottom means characterized by a smooth nonresistant path uniformly nonimpeding to a slidable nonbuckling advancement of the aligned briquettes, advancing successively into operative position a plurality of carriers disposed below said magazine means, coordinatingly discharging the aligned briquettes from said magazine means by removing said false bottom means so that said magazine means maintains said alignment and in relation to a subjacent carrier effects deposit of the briquettes onto a preselected location on the subjacent carrier, moving said carrier to successive positions wherein additional briquettes are successively loaded into said magazine means and thereafter vertically discharged onto selected locations on said carrier, and periodically advancing said carriers.

12. The process in accordance with claim 11, including the step of automatically sensing when the magazine means is full and coordinating the discharge to effect a discharge when the subjacent carrier is in position to receive the briquettes at a selected location of said carrier.

13. The process in accordance with claim 11, including automatically sensing the position of the carrier and thereby enabling said discharge when the carrier is in operative position.

14. The process in accordance with claim 11, including the steps of periodically advancing into operative position said carriers for the loading of said aligned briquettes at selected locations on a carrier and periodically removing loaded carriers and placing unloaded carriers for advancement to operative position.

15. The process in accordance with claim 11, further comprising the step of automatically terminating the advancement of said carriers upon failure to timely remove a loaded carrier.

16. The process in accordance with claim 11, including the step of aligning said briquettes in an orientation that maximizes the number of briquettes loaded onto a carrier.

17. The process in accordance with claim 11, including the steps of changing the width of said magazine means and changing the advancement of said carriers so that different size briquettes can be loaded.

* * * * *